(12) United States Patent
Leger

(10) Patent No.: US 7,505,691 B2
(45) Date of Patent: Mar. 17, 2009

(54) OPTICAL EMISSION MODULE

(75) Inventor: Francois Leger, St. Paul de Varces (FR)

(73) Assignee: Finisar Corporation, Sunnyvale, CA (US)

( * ) Notice: Subject to any disclaimer, the term of this patent is extended or adjusted under 35 U.S.C. 154(b) by 487 days.

(21) Appl. No.: 10/850,956

(22) Filed: May 21, 2004

(65) Prior Publication Data

US 2005/0259996 A1 Nov. 24, 2005

(51) Int. Cl.
*H04B 10/04* (2006.01)
*H01S 3/04* (2006.01)

(52) U.S. Cl. .................. 398/182; 398/192; 372/34; 372/38.07

(58) Field of Classification Search ............... 398/182, 398/197, 192, 193, 195, 194, 196; 372/29.015, 372/29.021, 34, 29.02, 38.02, 38.03, 38.07
See application file for complete search history.

(56) References Cited

U.S. PATENT DOCUMENTS

| 6,347,105 | B1 * | 2/2002 | Nakayama et al. | 372/38.07 |
|---|---|---|---|---|
| 6,792,020 | B2 * | 9/2004 | Romm | 372/38.09 |
| 6,917,639 | B2 * | 7/2005 | Ishida et al. | 372/38.02 |
| 2003/0138010 | A1 * | 7/2003 | Herz | 372/38.02 |

* cited by examiner

*Primary Examiner*—M. R. Sedighian
(74) *Attorney, Agent, or Firm*—Workman Nydegger

(57) ABSTRACT

An optical emission module including an optical emission element, which is driven by a current. A fuse is placed in the current's path. The fuse limits the current through the optical emission element and thereby guarantees that the optical output power of the optical emission element is limited to a maximum level which ensures eye safety.

9 Claims, 1 Drawing Sheet

OPTICAL EMISSION MODULE

FIELD OF THE INVENTION

The invention relates to an optical emission module, in particular for optical data transmission systems. The optical emission module comprises at least one emission element (e.g. a laser).

BACKGROUND OF THE INVENTION

In order to guarantee laser eye safety, prior art emission modules comprise usually a monitoring photodiode. The monitoring photodiode is placed close to the emission element and collects a portion of the emitted light of the emission element. The monitoring photodiode converts this light into a photocurrent that is a direct measure of the optical output power of the emission element. The photocurrent is measured by an electronic circuit which will switch off the electrical current of the emission element, if the photocurrent exceeds a predefined threshold value. Accordingly, the electronic circuit provides laser eye safety.

SUMMARY OF THE INVENTION

According to an aspect of the present invention, an optical emission module is provided which ensures a high degree of eye safety for the module's operator.

According to another aspect of the invention, an optical emission module is provided that can be operated safely without a monitoring photodiode.

According to yet another object of the invention, an optical emission module is provided that can be fabricated at low cost. Accordingly, an optical emission module is provided which works reliably and safely without complex electronic circuits for monitoring the optical emission and which nevertheless ensures eye safety.

According to an embodiment of the invention, the optical emission module comprises an optical emission element, which is driven by a current. A fuse is placed in the current's path. The fuse limits the current through the optical emission element and thereby guarantees that the optical output power of the optical emission element is limited to a maximum level which still ensures eye safety.

The invention is advantageous in particular, if the optical emission element is realized by a laser, as lasers can cause severe injury to human eyes.

The invention may also be used in an optical transceiver module having at least said emission element and at least one receiving element.

Preferably, the current path of the optical emission element comprises a bias current path and a modulation current path. In such cases, the fuse can be placed in the path of the bias current and/or in the path of the modulation current.

According to a first preferred embodiment of the invention, the fuse is destroyed when the current exceeds a predetermined current limit. Said predetermined limit preferably correlates to a predefined optical threshold value that ensures eye safety.

According to a second preferred embodiment of the invention, the fuse is a thermal (thermally activated) fuse, which switches off the current if its temperature exceeds a thermal threshold value, and which switches on the current again, if its temperature falls below said thermal threshold value. Said thermal threshold value correlates preferably to a predetermined current limit and/or to a predefined optical threshold value that ensures eye safety.

DETAILED DESCRIPTION OF THE PREFERRED EMBODIMENT

Figure 1:
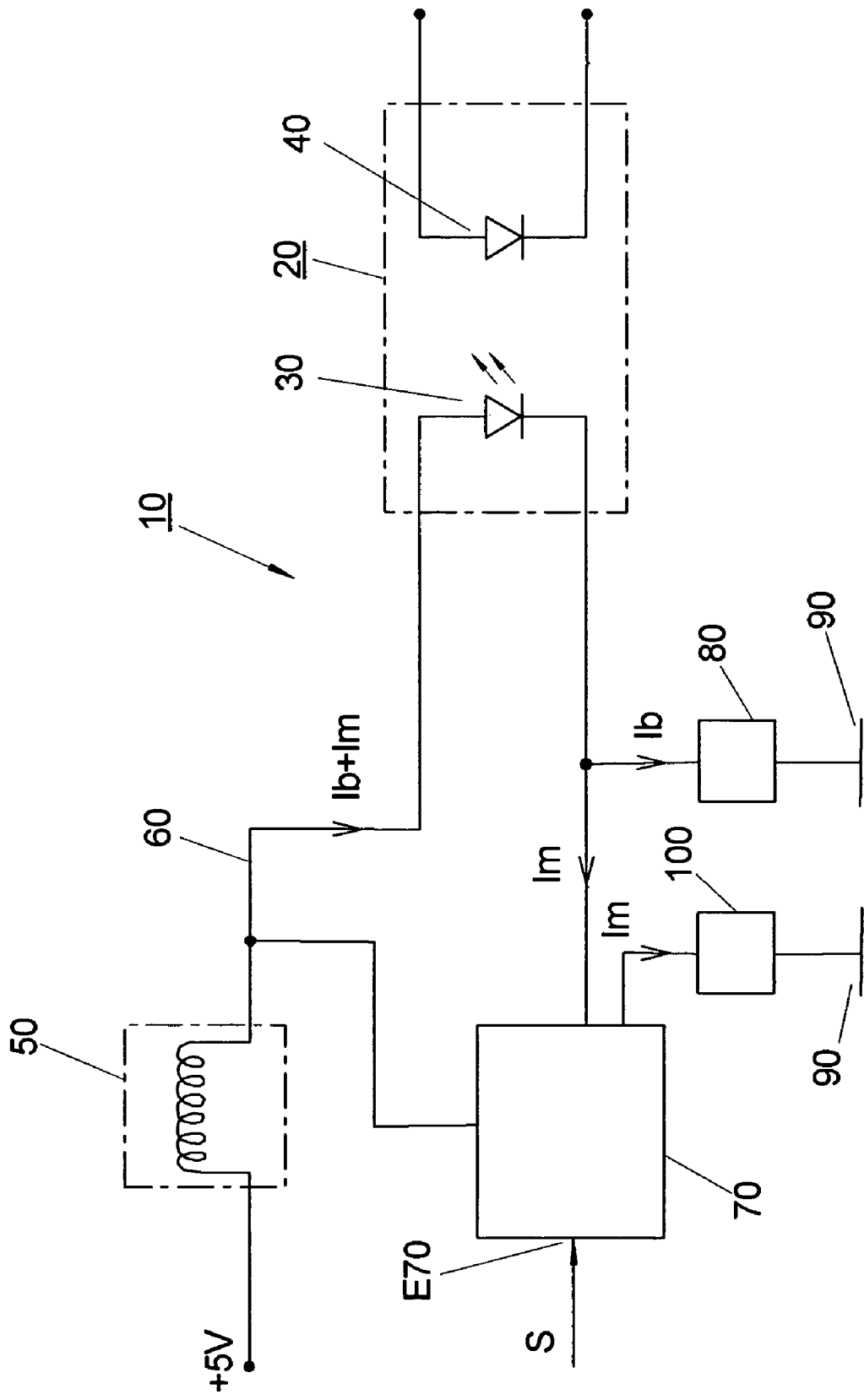
FIG. 1 shows an exemplary embodiment of an optical emission module comprising a fuse for laser eye safety purposes.

The emission module 10 according to FIG. 1 comprises a laser source module 20 consisting of an optical emission element 30 and a monitoring photodiode 40. The optical emission element 30 is formed by a laser diode.

A Bias-voltage of +5V provides a bias current Ib and a modulation current Im to the laser's anode LD-A. Both, the bias current Ib and the modulation current Im reach the laser 30 via a fuse 50 and an electrical connection line 60.

The laser's cathode LD-C is connected with a modulator circuit 70 and with a bias control device 80. The bias control device 80 controls and regulates the bias current Ib that flows from the laser 30 to a ground contact 90.

The modulation current Im flows to the modulator circuit 70 which modulates the current. For this purpose, the modulator circuit 70 is connected with the 5V-Bias-voltage (via the fuse 50) and with a modulation control device 100.

The modulation control device 100 controls the modulation level (e. g. peak value) of the modulation current Im whereas the modulator circuit 70 modulates the current. The modulation control device 100 is also coupled to the ground contact 90.

The modulator circuit 70 comprises a signal input E70. Via this signal input E70, a data signal S can be fed into the modulator circuit 70. The modulator circuit 70 modulates the laser's current according to the data signal S.

With regard to laser eye safety, the emission module 10 according to FIG. 1 operates as follows:

The bias current Ib and the modulation current Im are both passing through the fuse 50. If the current Ib+Im exceeds a fixed threshold value Imax—e. g. in case of a failure of the modulator circuit 70, in case of a failure of the bias control device 80 or in case of an increasing bias voltage - , the fuse 50 will be destroyed and the current Im+Ib will be interrupted immediately.

The fuse 50 is designed (constructed) such that it switches off the current Ib+Im, if the current Ib+Im exceeds a current threshold value Imax that correlates to a predefined optical threshold value Pmax of the laser 30. Accordingly, the emission module 10 provides for laser eye safety as too large laser currents cannot be fed into the emission module 20.

Alternatively, the fuse 50 can also be a thermal fuse, that switches off the current Im+Ib if its temperature T exceeds a thermal threshold value Tmax, and that switches on the current Im+Ib again, if its temperature T falls back below said thermal threshold value Tmax. In this case, the thermal threshold value Tmax corresponds to a predefined optical threshold value Pmax of the laser 30. For instance, the appropriate thermal threshold value Tmax can be determined by experiment before starting a regular operation of the emission module 10.

LIST OF REFERENCE NUMERALS

10 emission module
20 laser source module
30 laser
40 photodiode
50 fuse 60 electrical connection line
70 modulator circuit
80 bias control device
90 ground contact
100 modulation control device
E70 signal input
S data signal
Ib bias current
Im modulation current
Ib+Im laser current

I claim:

1. An optical emission module comprising:
   an optical emission element driven by a current including a bias current portion and a modulation current portion that is transmitted on a current path; and
   a fuse connected in the current path, wherein both the bias current portion and the modulation current portion pass through the fuse;
   wherein said fuse is constructed such that the fuse switches off the current when an optical output power of said emission element exceeds a predefined optical threshold value; and
   wherein the fuse can also be a thermal fuse, which switches off the current when a temperature of the thermal fuse exceeds a predefined thermal threshold value, and which switches on the current when temperature falls below said predefined thermal threshold value;
   wherein said predefined thermal threshold value correlates to said predefined optical threshold value.

2. The optical emission module according to claim 1, wherein the fuse is constructed such that the fuse switches off the current when the current exceeds a predefined current threshold value.

3. The optical emission module according to claim 2, wherein the fuse is destroyed when the current exceeds said current threshold value.

4. The optical emission module according to claim 3, wherein the optical emission element comprises a laser.

5. The optical emission module according to claim 4, wherein the predefined optical threshold value corresponds to a maximum safe operation of the laser to ensure eye safety during operation.

6. The optical emission module according to claim 5, wherein the emission module comprises an optical transceiver module having at least said emission element and at least one receiving element.

7. The optical emission module according to claim 1, wherein the optical emission element comprises a laser.

8. The optical emission module according to claim 7, wherein the predefined optical threshold value corresponds to a maximum safe operation of the laser to ensure eye safety during operation.

9. The optical emission module according to claim 8, wherein the optical emission module comprises an optical transceiver module having at least said emission element and at least one receiving element.

* * * * *